(12) United States Patent
Nita

(10) Patent No.: US 7,164,347 B2
(45) Date of Patent: Jan. 16, 2007

(54) MANNEQUIN

(76) Inventor: Beverely Nita, 17 Francis Street, Mansfield, Nottinghamshire (GB) NG18 2NW ( * ) Notice: Subject to any disclaimer, the term of this patent is extended or adjusted under 35 U.S.C. 154(b) by 296 days.

(21) Appl. No.: 10/951,399

(22) Filed: Sep. 28, 2004

(65) Prior Publication Data

US 2006/0073448 A1    Apr. 6, 2006

(51) Int. Cl.
*G08B 27/00* (2006.01)
(52) U.S. Cl. .................. 340/326; 434/219; 434/270; 434/94

(58) Field of Classification Search ............... 340/326; 434/219, 270, 94
See application file for complete search history.

(56) References Cited

U.S. PATENT DOCUMENTS

2006/0073448 A1* 4/2006 Nita ........................... 434/219

* cited by examiner

*Primary Examiner*—Daniel Wu
*Assistant Examiner*—Travis Hunnings
(74) *Attorney, Agent, or Firm*—McKee, Voorhees & Sease, P.L.C.

(57) ABSTRACT

A mannequin suitable for use as a hairdressing training tool including a head component, a hair portion, sensors for sensing undesirable characteristics such as high temperature or rapid movement, and signalling means for indicating the same to a user.

19 Claims, 1 Drawing Sheet

MANNEQUIN

Figure 1:
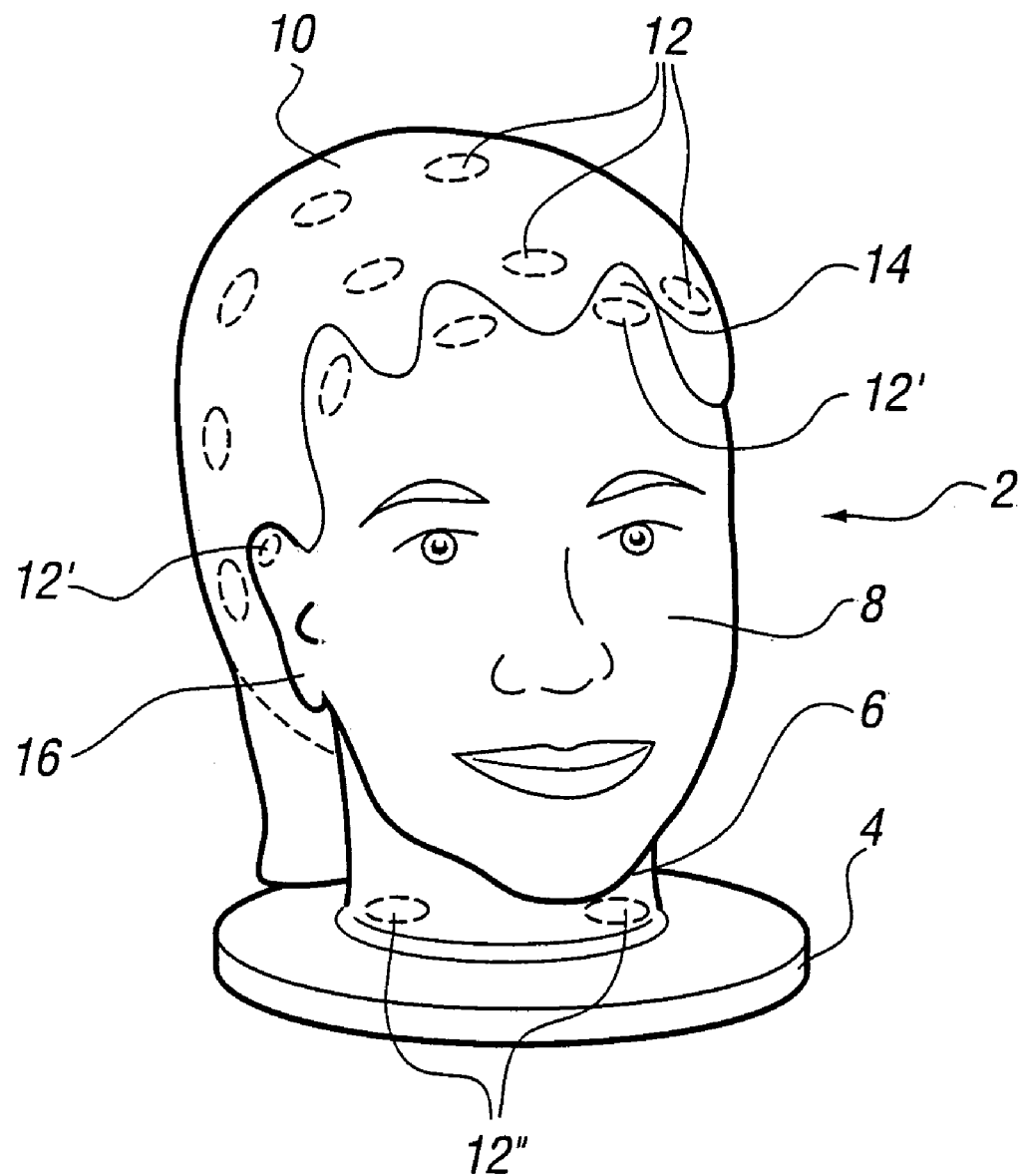

This invention relates to a mannequin and particularly, but not exclusively, to a mannequin head suitable for use as a hairdressing tool.

It is known to provide a mannequin head for use as a hairdressing tool. The head allows trainee hairdressers to practise on hair to improve their hair cutting, blow drying and styling skills without the risk of injury to a real person/client. In addition, use of the mannequin heads for training purposes reduces the likelihood of a trainee making a mistake on a client's hair, thereby avoiding the distress associated with a client being given a bad or inappropriate haircut.

A problem with conventional mannequins is that their use as training aids is limited. This is because whilst the trainee and trainer can visually determine the success of a particular haircut on the mannequin, they are unable to determine the level of discomfort a client may have experienced during the haircut. Common causes of discomfort include the hairdresser moving the client's head too quickly or with too much force in order to position the head in a required position, thereby risking muscle injury to the client, burning the hair or skin during blow drying due to holding the hairdryer too close to the client's head or directing the hot air flow for too long a time period on one particular part of the client's head, getting shampoo, hair treatment solutions or water in the client's eyes and/or the like. Thus currently, a trainee hairdresser only discovers that their hairdressing techniques are causing discomfort to a client when they are cutting a client's hair and the client complains. This is obviously undesirable and may result in hairdressing establishments losing business.

A further current problem associated with the mannequin heads is that in order for a trainer to monitor the progress of a trainee, the trainer is required to closely watch the trainee. This is time consuming and may place the trainee under considerable pressure. In addition, it prevents the trainer from monitoring the training of a number of trainees at any one time.

It is therefore an aim of the present invention to provide a mannequin which overcomes the abovementioned problems.

According to a first aspect of the present invention there is provided a mannequin suitable for use as a hairdressing training tool, said mannequin including at least a head component, hair located on at least a portion of said head component and sensing means associated with said hair and/or said head component for sensing one or more characteristics relating to said hair and/or said head component.

The one or more sensing means can include any or any combination of temperature sensors, movement sensors, strain sensors, liquid sensors and/or the like.

Preferably the sensing means are provided at one or more pre-determined positions on the head component, hair and/or on one or more other parts of the mannequin, such as on a neck portion, ears, forehead, eyes, face and/or the like.

The temperature sensors typically allow detection of when the head component, hair and/or other portion of the mannequin gets for example too hot as a result of blow drying or using curling tongs or hair straighteners. The temperature sensors can also detect when the temperature of a portion of the mannequin becomes too cold.

The movement sensors typically allow detection of when the head component, hair and/or other portion of the mannequin is being moved for example too frequently, with too much force, too fast and/or the like.

The strain sensors typically allow detection of when the head component, hair and/or other portion of the mannequin is being moved with for example too much force.

The liquid sensors typically allow detection of when the head component, hair and/or other portion of the mannequin, such as eyes on the mannequin, contact a liquid. The liquid sensors can detect a specific liquid or group of liquids, such as water based liquids, dyes, bleach and/or the like.

The sensing means can detect/sense the one or more characteristics above or below a pre-determined level; above, below or within one or more pre-determined ranges, the frequency and/or the like. The levels, ranges, frequency and/or the like are typically based on known parameters which in practise are likely to cause discomfort and/or pain to a person.

The term 'hair' can include any type of hair whether real and/or synthetic and, if real hair is used, the hair can be taken from a human and/or animal as required.

In one embodiment signalling means are provided on or associated with the mannequin, such that on sensing/detection of said one or more characteristics by said sensing means, said signalling means are activated. The signalling means can be used to allow a user of the mannequin or one or more persons remote from the mannequin to be provided with feedback on the progress of a haircut or manipulation of the head and/or hair.

This feedback is preferably substantially instantaneous, thereby allowing the user to correct any mistake they are making.

Preferably the sensing means are provided underneath an upper surface layer of the mannequin.

In one embodiment the sensing means are provided at the point of attachment of the hair to the head component.

The sensing means are typically provided at a plurality of spaced locations on the mannequin. The sensing means can cover one or more parts or substantially all of the mannequin.

Preferably signals generated by said signalling means and/or said sensing means are provided with unique identification means, thereby allowing a user or processing means to determine which portion of the mannequin has sensed or signalled said one or more of the characteristics.

Preferably the signalling means include audio, visual and/or kinaesthetic signalling means.

For example, the signalling means can include a plurality of lights, LEDs and/or the like which are lit on detection of said characteristic, one or more audible alarm(s) which sound on detection of said characteristic, different levels or frequencies of vibration and/or the like. The signalling means can be provided on the mannequin or on a display screen integral with or communicating with the mannequin.

The vibration means can be provided on the user and/or on the mannequin.

In one embodiment the audio signalling means can include one or more evocative signals, speech, sounds and/or the like. For example, the audio signals can include words created by a speech synthesiser or recording to indicate symptoms of discomfort which might be made by a real person and/or suggestions for improvement in technique to avoid the characteristic being detected again.

The signalling means can be provided at or adjacent to the location of the sensing means, thereby allowing a user to determine which of a plurality of sensing means has been activated. Alternatively or in addition the signalling means can be provided remote to the mannequin, such that for example a trainer can determine whether signalling means have been activated.

Preferably the mannequin has a self test function such that the functionality of the sensors and/or signalling means can be checked.

Preferably micro-processing means are provided with the mannequin and/or computer system to allow processing of said data detected by said sensing means.

In one embodiment the mannequin communicates with a computer system which analyses the data detected by the sensing means and either stores the data or displays the data on a display screen. This allows a user training on the mannequin and/or a third party overseeing the training to review the data during or after use of the mannequin. The computer system can be located with the mannequin or remotely therefrom.

Preferably a plurality of mannequins are in communication with the computer system, thereby allowing a third party to monitor the progress of a number of trainee hairdressers or mannequin users. The mannequin can be connected to each other and/or the computer system via wireless means, such as radio waves, infra red, microwaves and/or the like, or via wired means, such as cable, wiring and/or the like.

According to a second aspect of the present invention there is provided a method of using a mannequin as a hairdressing training tool, said mannequin including at least a head component, said head component provided with sensing means thereon and wherein said method includes the steps of a user manipulating at least the head component in a particular manner and, during this manipulation, if one or more characteristics relating to said head component are detected, signalling means provided in or associated with said mannequin are activated and/or data relating to said sensed characteristics is stored in storage means provided in or associated with said mannequin.

According to a further aspect of the present invention there is provided a hairdressing training mannequin.

According to a yet further aspect of the present invention there is provided a hairdressing training system, said system including a plurality of mannequins communicating with micro-processing means, each mannequin including a head component, hair located on at least a portion of said head component and sensing means associated with said hair and/or head component for sensing one or more characteristics relating to said hair and/or head component and, on detection of said one or more characteristics by one or more of said mannequins, one or more signals are sent to said micro-processing means identifying said one or more mannequins and said or more characteristics.

The micro-processing means are typically located remotely to the mannequins and preferably the micro-processing means are in the form of a computer system.

Preferably a display screen is associated with said micro-processing means to allow a trainer or user to view the data being collected from one or more of said mannequins.

The present invention therefore has the advantage of providing a useful training aid to hairdressers who need to learn the levels of movement, strain temperature and/or the like which when inflicted on the head and/or hair of a client are likely to result in the client feeling discomfort or pain. The mannequin can provide instant feedback or record and store feedback for later use, thereby allowing the skills of the user to be increased without the need for a trainer to be constantly watching the trainee.

Embodiments of the present invention will now be described with reference to the accompanying figure, wherein:

FIG. 1 is an example of a mannequin head component according to an embodiment of the present invention;

Referring to the figure, there is illustrated a mannequin head component 2 including a stand 4 on which the head component 2 is supported, a neck portion 6, a face portion 8 and hair portion 10. The stand 4 is typically clamped to a work surface to provide stability to the head component 2 during use.

The mannequin head is typically used as a tool to train hairdressers as it allows the hair to be cut, washed and coloured without the risk of causing injury to a real person. It also allows the trainee hairdresser to make mistakes with the hair cut whilst preventing distress to a client. Current mannequins have only limited use and still generally require a trainer to supervise the trainee to ensure they are using suitable hairdressing techniques.

The main problem associated with teaching a trainee hairdresser is teaching the trainee to know when they are likely to be applying too much force on the head and/or hair of a client, such as combing or brushing the hair too severely, moving the head to a required angle too quickly or with sufficient force to cause muscle damage to the client, when they may be burning the client due to using a hairdryer too close to the head or hair or using the hairdryer on a portion of the head for too long and/or the like.

In accordance with one embodiment of the present invention there is provided an improved mannequin head component, which is provided with means to allow a user to gain feedback on the hairdressing techniques being employed during use of the mannequin.

The feedback is provided by a combination of a plurality of sensors 12 which are located at pre-determined positions on the hair portion of the head and signalling means. The sensors 12 include movement sensors which detect movement of the hair and/or head and temperature sensors which detect the temperature of the hair and/or head. Once pre-determined levels of movement and/or temperature are detected by the sensors following user manipulation of the mannequin in a particular manner, signalling means in the form of an audible alarm and/or a plurality of light emitting diodes (LEDs) are actuated and/or lit respectively. The mannequin typically is provided with a speaker thereon to allow the alarm to be heard by a user.

A microprocessor and memory means are provided in the mannequin head to process and record the detected characteristics of movement, temperature and/or the like.

The LEDs can be provided on the mannequin at a location adjacent the sensor or sensors, such that the LED(s) associated with the sensor detecting the movement or temperature are lit once a threshold level has been detected. The LEDs are typically visible through the hair. In this manner, the user can get substantially instant feedback when they have made a mistake and can determine the location of where the problem is. Alternatively, or in addition, the mannequin can be connected to a computer system to allow data collected from the sensors and/or signalling means to be analysed and stored. This allows a trainer to monitor the progress of the trainee remotely and also allows the trainee to review their haircut/hair styling at a later date. A number of mannequins can be connected to a central computer system to allow a trainer to oversee a number of trainers.

Each sensor can have a unique identification address, such as a digital code, which allows the position of each sensor on the head to be determined, thereby identifying which part of the mannequin head detected abnormal/excessive movement or temperature.

Additional temperature sensors 12' can be provided on sensitive parts of the head which are susceptible to being burnt by hairdryers, such as the forehead 14 and ears 16. Additional movement sensors 12" can be provided on the neck 6 of the mannequin head to detect movement of the head in the neck area. In addition, different threshold levels can be associated with different sensors on the head or hair components depending on their location to reflect the different levels of sensitivity of skin parts in a user.

By using the feedback signals provided by the mannequin, a trainee is able to learn from the signals and realise when a real person/client would have experienced discomfort. The predetermined threshold levels of the sensors at which the signalling means actuates a signal can be adjusted according to the skill level of the user/trainee. For example, the threshold levels can be set at a low limit for more experienced hairdressers, thereby making the sensors particularly sensitive to abnormal/excessive movement or temperature. Alternatively, the threshold levels can be set at a higher limit for novice hairdressers.

The signal means can be set to emit a single warning signal on detection of a pre-determined threshold limit, emit a continuous warning signal or an intermittent warning signal. Different audible sounds can be emitted according to which part of the head the sensor detecting the measurement outside the predetermined threshold range is located.

Thus the present invention provides an improved mannequin which has a wider range of training uses than conventional mannequins.

The invention claimed is:

1. A mannequin suitable for use as a hairdressing training tool, said mannequin including a head component, hair located on at least a portion of said head component and sensing means associated with said hair and/or head component for sensing one or more characteristics relating to said hair and/or head component.

2. A mannequin according to claim 1 wherein the sensing means are in communication with one or more signalling means.

3. A mannequin according to claim 2 wherein said one or more signalling means signal to a user when said one or more sensing means detect said one or more characteristics at a predetermined level or within or outside one or more predetermined parameter ranges.

4. A mannequin according to claim 2 wherein the signalling means are any or any combination of audible, visual or kinaesthetic signalling means.

5. A mannequin according to claim 4 wherein the visual signalling means are in the form of one or more lights or LEDs.

6. A mannequin according to claim 4 wherein the audible signalling means include one or more alarms, sounds or speech.

7. A mannequin according to claim 4 wherein the kinaesthetic signalling means include vibration means provided on the user or mannequin.

8. A mannequin according to claim 2 wherein the signalling means are at or adjacent to the location of the sensing means on the mannequin.

9. A mannequin according to claim 2 wherein the signalling means are provided at a location remote to the mannequin.

10. A mannequin according to claim 1 or claim 2 wherein the signals generated by the sensing means and/or signalling means are provided with unique identification means associated therewith.

11. A mannequin according to claim 1 wherein the sensing means include any or any combination of temperature sensors, movement sensors, strain sensors or liquid sensors.

12. A mannequin according to claim 1 wherein the sensing means are provided underneath an upper surface layer of the mannequin.

13. A mannequin according to claim 1 wherein the sensing means are provided at a point of attachment of the hair to the head component.

14. A mannequin according to claim 1 wherein the mannequin further includes any or any combination of a neck portion, ears, forehead, face or eyes and said sensing means are associated with one or more of the same.

15. A mannequin according to claim 1 wherein the sensing means are in communication with micro-processing means located in, associated with and/or remote to the mannequin.

16. A mannequin according to claim 1 wherein the sensing means are provided with memory means located in, associated with and/or remote to the mannequin.

17. A mannequin according to claim 1 wherein means are provided for testing the sensing means.

18. A method of using a mannequin as a hairdressing training tool, said mannequin including at least a head component, said head component provided with sensing means thereon and wherein said method includes the steps of a user manipulating at least the head component in a particular manner during use and, during this manipulation, if one or more characteristics relating to said head component are detected, signalling means provided in or associated with said mannequin are activated and/or data relating to said sensed characteristics are stored in storage means provided in or associated with said mannequin.

19. A hairdressing training system, said system including a plurality of mannequins communicating with micro-processing means, each mannequin including a head component, hair located on at least a portion of said head component and sensing means associated with said hair and/or head component for sensing one or more characteristics relating to said hair and/or head component and, on detection of said one or more characteristics by one or more of said mannequins, one or more signals are sent to said micro-processing means identifying said one or more mannequins and said or more characteristics.

* * * * *